(12) United States Patent
Franco et al.

(10) Patent No.: US 11,312,307 B2
(45) Date of Patent: Apr. 26, 2022

(54) RETRACTABLE STEP SYSTEM FOR GETTING INTO AND OUT OF A VEHICLE, AND VEHICLE DOOR ASSEMBLY PROVIDED WITH SUCH A SYSTEM

(71) Applicant: HITACHI RAIL S.p.A., Naples (IT)

(72) Inventors: Vincenzo Franco, Serravalle Pistoiese (IT); Umberto Vivarelli, Pistoia (IT); Stefano Mange', Campi Bisenzio (IT); Riccardo Marchi, Vaglia (IT)

(73) Assignee: HITACHI RAIL S.P.A., Naples (IT)

( * ) Notice: Subject to any disclaimer, the term of this patent is extended or adjusted under 35 U.S.C. 154(b) by 106 days.

(21) Appl. No.: 16/943,455

(22) Filed: Jul. 30, 2020

(65) Prior Publication Data

US 2021/0031697 A1 Feb. 4, 2021

(30) Foreign Application Priority Data

Aug. 2, 2019 (IT) ........................ 102019000013872

(51) Int. Cl.
*B60R 3/02* (2006.01)
(52) U.S. Cl.
CPC ...................................... *B60R 3/02* (2013.01)
(58) Field of Classification Search
CPC ....................................................... B60R 3/02
See application file for complete search history.

(56) References Cited

U.S. PATENT DOCUMENTS

| | | | |
|---|---|---|---|
| 1,042,895 A | 10/1912 | Desens et al. | |
| 1,052,364 A | 2/1913 | Morris | |
| 1,109,224 A | 9/1914 | Herrin | |
| 3,033,309 A * | 5/1962 | Fugere | E06C 1/381 182/90 |
| 4,071,260 A * | 1/1978 | Marshall, Sr. | B60R 3/02 280/166 |
| 4,324,317 A * | 4/1982 | Winkelblech | A01D 41/1261 182/141 |
| 6,263,804 B1 | 7/2001 | Rizk | |
| 7,699,328 B2 | 4/2010 | Crawford | |
| 2009/0021049 A1* | 1/2009 | Crawford | B60R 3/02 296/190.11 |
| 2015/0197198 A1* | 7/2015 | Egner | E06C 1/125 182/77 |
| 2016/0339842 A1* | 11/2016 | Schut | B60P 1/4421 |
| 2016/0339845 A1* | 11/2016 | Schut | B60R 3/02 |

\* cited by examiner

*Primary Examiner* — Bryan A Evans
(74) *Attorney, Agent, or Firm* — Leason Ellis LLP

(57) ABSTRACT

A retractable step system for getting into and out of a vehicle has at least one step and a supporting element, which carries the step and is movable between a raised position and a lowered position; in the lowered position, the step projects from the supporting element along a first horizontal axis so as to allow a user to place a foot on it; the system has a control member, which can be manually operated, and a stop device, which holds the supporting element in the raised position, when the control member is arranged in a first position, and allows the supporting element to freely move to the lowered position, when the control member is arranged in a second position; the control member has a retention portion, which, in the second position, projects along a second horizontal axis, which is orthogonal to the first horizontal axis, so as to keep, in use, a vehicle door open.

15 Claims, 6 Drawing Sheets

RETRACTABLE STEP SYSTEM FOR GETTING INTO AND OUT OF A VEHICLE, AND VEHICLE DOOR ASSEMBLY PROVIDED WITH SUCH A SYSTEM

CROSS-REFERENCE TO RELATED APPLICATIONS

This patent application claims priority from Italian patent application no. 102019000013872 filed on Aug. 2, 2019, the entire disclosure of which is incorporated herein by reference.

TECHNICAL FIELD

The invention relates to a retractable step system for getting into and out of a vehicle, in particular for letting a motorman into and out of a railway vehicle, to which reference will be made in the description below without loosing in generality because of this.

BACKGROUND OF THE INVENTION

In the lead cars of trains, an additional step is needed in order to allow the motorman/driver to easily and safely get into and out of the car when the train has to stop in areas other than train stations, where suitable platforms are provided. In these areas, indeed, the height distance between the walking plane of the car and the ballast for the railway tracks can be relatively high, so that the steps that are usually provided on the train are not sufficient to allow the driver to safely get into and out of the car.

In particular, since the size of railway vehicles, in cross section, cannot exceed the so-called structure gauge, which ensures the absence of interferences with fixed infrastructures, a retractable system is needed, namely a system having one or more steps that can be moved between an extended operating configuration (inevitably outside of the structure gauge) and a retracted rest position, which is reached in a completely mechanical manner and by means of hand operations, hence without electrical connections to the power supply systems and to the sensors of the train, but, nonetheless, capable of ensuring a high degree of safety and limited size. More in detail, the steps need to be capable of being moved back to the retracted rest position before the vehicle starts running again, so as to make sure that the structure gauge is restored.

SUMMARY OF THE INVENTION

The object of the invention is to provide a retractable step system for getting into and out of a vehicle, which allows to fulfil the needs discussed above in a simple and economic fashion.

According to the invention, there is provided a retractable step system for getting into and out of a vehicle according to claim 1.

Furthermore, the invention relates to a vehicle door assembly according to claim 14.

BRIEF DESCRIPTION OF THE DRAWINGS

The invention will be best understood upon perusal of the following description of a preferred embodiment, provided by way of a mere explanatory, non-limiting example, with reference to the accompanying drawings, wherein.

DETAILED DESCRIPTION OF THE INVENTION

Figure 1:
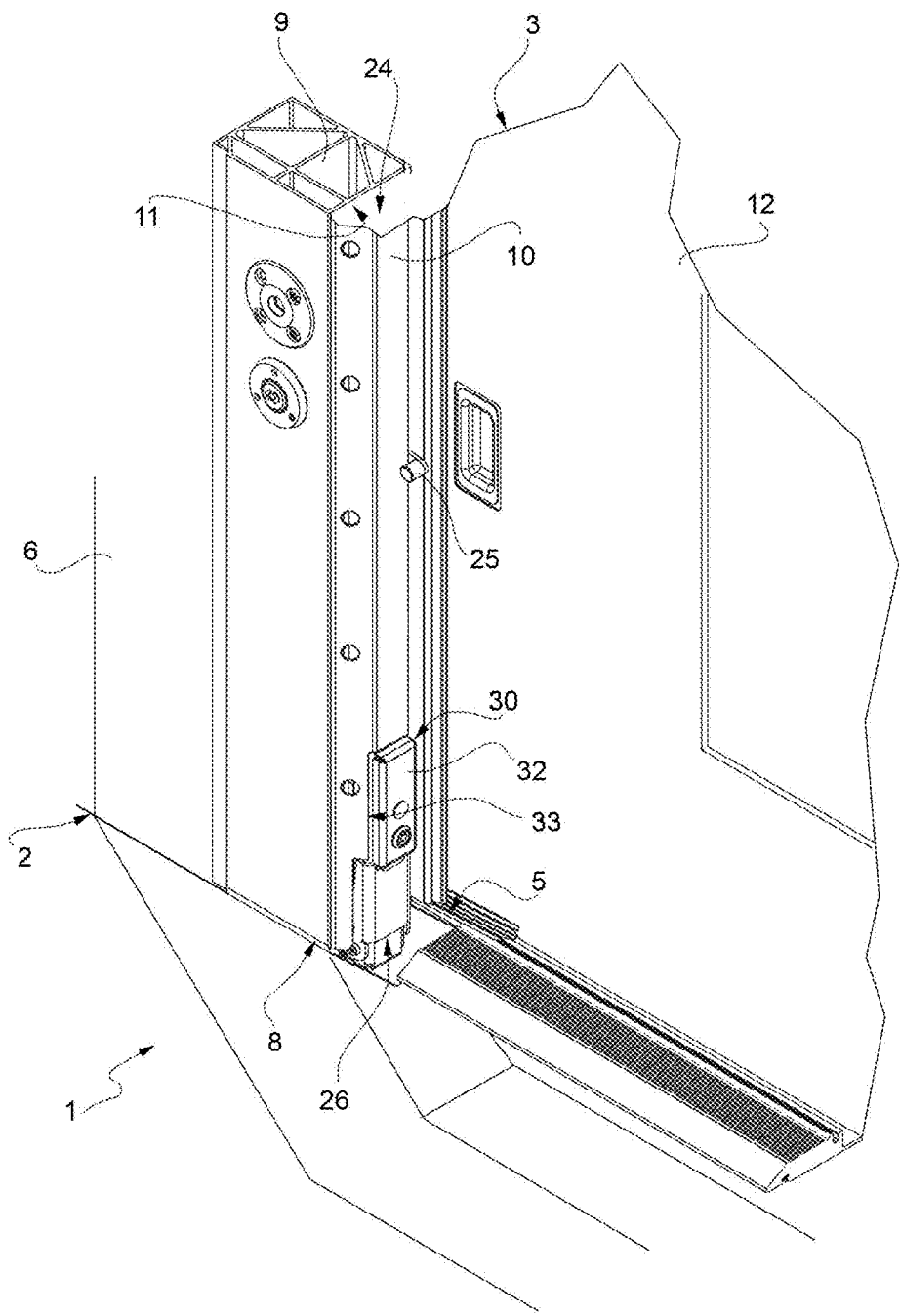
FIG. 1 is a perspective view of a preferred embodiment of the retractable step system for getting into and out of a vehicle according to the present invention.

In FIG. 1, reference number 1 indicates a retractable step system for getting into and out of a (partially shown) car 2, which preferably is part of a railway vehicle (which is not shown), through a door 3. The door 3 is arranged in the area of a side wall 6 of the car 2 and comprises a doorway 5 and two uprights, which are arranged on opposite sides of the doorway 5. Only one of the uprights is visible in FIG. 1 and is indicated with reference number 8. For example, the upright 8 has a supporting structure 9 and a finishing lining 10, which is fixed to the structure 9 so as to cover at least part of an outer surface 11 thereof. The door 3 further comprises at least one leaf 12, which is movable between a closing position (FIG. 1) and an opening position (FIG. 4) so as to close/open the doorway 5, due to the action of an actuator device, which is not shown herein.

Figure 4:
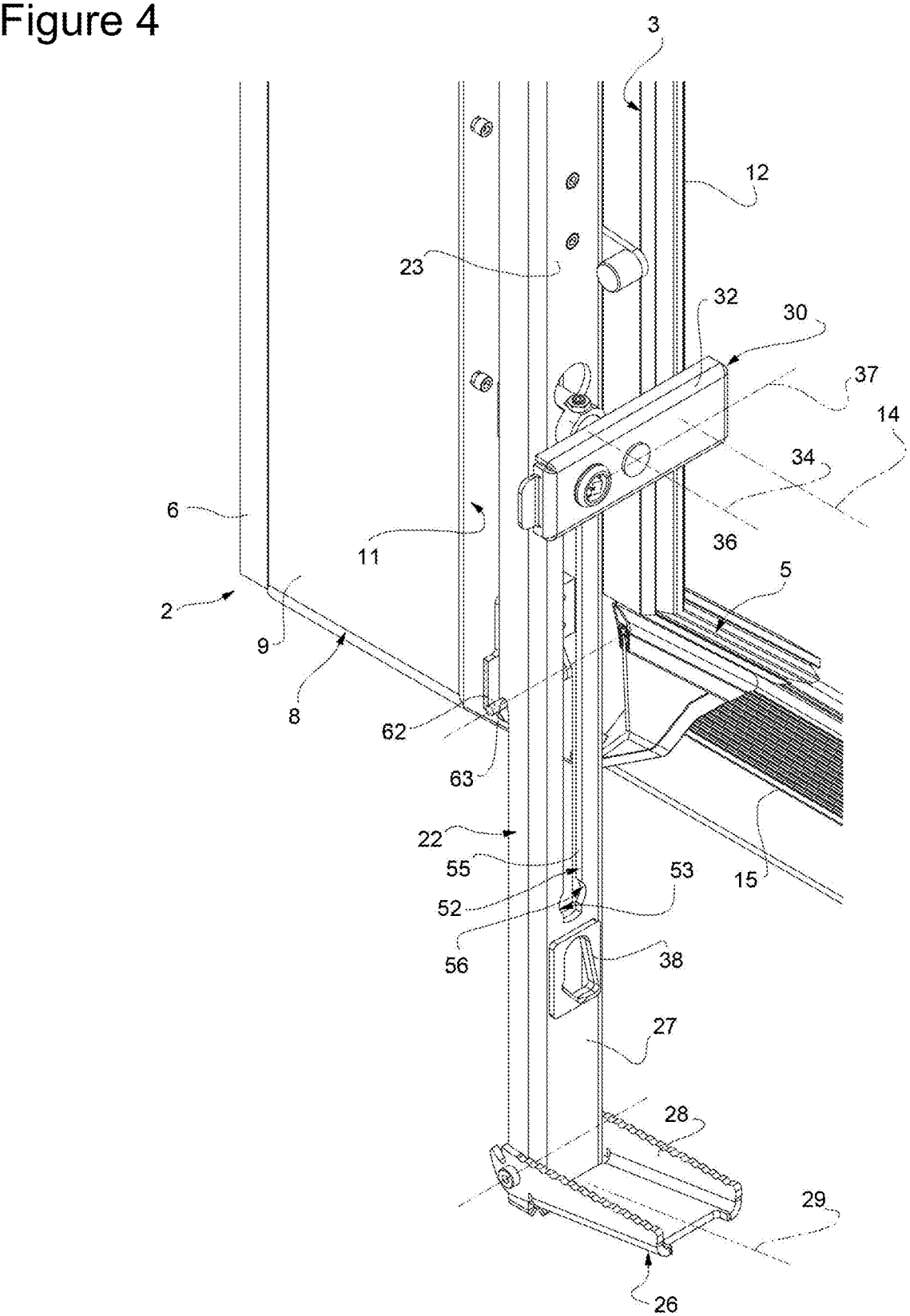
FIG. 4 is similar to FIG. 1 and shows the system arranged in the extended operating configuration, with parts removed for greater clarity.

According to FIG. 4, in the opening position, the leaf 12 is preferably arranged behind the upright 8 and is parallel to the side wall 6; the movement of the leaf 12 between the opening position and the closing position comprises a translation component along a horizontal direction 14, which is parallel to the side wall 6.

In particular, the door 3 comprises a step 15, which is of known kind, is not described in detail and is arranged at the same level as, or under, the threshold of the doorway 5, so as to allow drivers to go up and down between the walking plane of the car 2 and the usual platforms normally provided in railway stations. According to an alternative which is not shown herein, the step 15 could not be built-in in the door 3, but be a distinct component.

With reference to FIG. 1, the system 1 is supported by the upright 8 and is preferably arranged on the surface 11 in the area of a lower zone, which is not covered by the lining 10. The system 1 can be manually configured between a retracted rest configuration and an extended operating configuration. Based on what described in detail hereinafter, the system 1 is a merely mechanical system, namely is not provided with electrical/electronic parts. In the retracted configuration, the system 1 is arranged so as to be flush with the outer profile of the lining 10 or to project from the latter in an insignificant manner.

Figure 2:
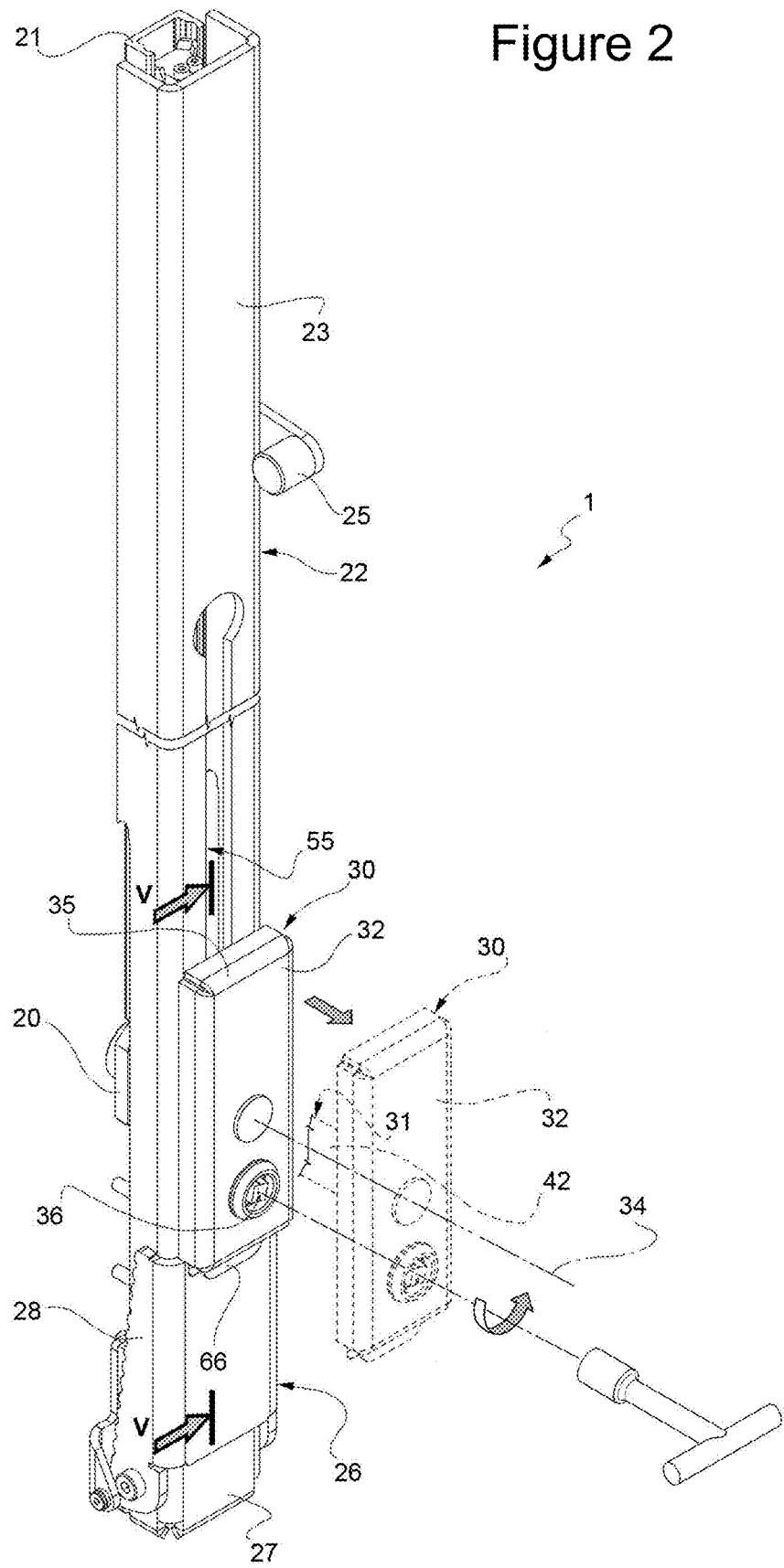
FIG. 2 shows, on a larger scale and with parts removed for greater clarity, the system of FIG. 1 in a retracted rest configuration.

With reference to FIG. 2, the system 1 comprises an attachment structure 20, which is fixed to the structure 9 and carries, in a fixed position, a guide 21. The system 1 further comprises a supporting element, which, in the embodiment shown herein, is defined by a vertical bar 22, which is coupled to the guide 21 so as to vertically slide between a raised rest position (FIG. 2), corresponding to the retracted position, and a lowered operating position (FIG. 4), corresponding to the extended configuration. The bar 22 basically moves downward along the guide 21 because of the weight.

The bar 22 comprises an upper portion 23, which, in the raised position, is housed in a compartment 24 (FIG. 1) arranged between the lining 10 and the surface 11. The upper portion 23 preferably carries an appendage 25, which projects through the lining 10, i.e. outside of the compartment 24, so that it can manually be operated by a user in order to lift the bar 22 along the guide 21.

The system 1 further comprises a step 26, which is coupled to a lower end 27 of the bar 22 in a movable manner between a vertical rest position (FIG. 2), corresponding to the retracted configuration, and a horizontal support position (FIG. 4), corresponding to the extended configuration. The step 26 comprises a footboard or support portion 28, which, in the horizontal position, projects from the bar 22 along a horizontal axis 29 (FIG. 4), which is parallel to the direction 14, so as to allow a foot to be placed on it. The step 26 is preferably hinged to the end 27 about a hinge axis, which is orthogonal to the axis 29.

According to FIG. 2, in the vertical position, the footboard 28 faces upward and horizontally faces the bar 22.

The system 1 further comprises a control member 30, which is movable in response to a manual action of a user, and a stop device 31, which is active and vertically holds the bar 22 in the raised position when the member 30 is arranged in a first position (represented with a broken line in FIG. 2, where the horizontal distance from the bar 22 is shown out of scale for clarity reasons). The stop device 31 is inactive and allows the bar 22 to freely move in a vertical manner between the raised position and the lowered position when the member 30 is arranged in a second position (shown in FIGS. 3 and 4), which is distinct from the first one.

According to FIG. 1, in particular, the member 30 comprises a plate 32, which, in the retracted configuration, is arranged in a recess or slot 33 of the lining 10, so that it is outside of the compartment 24 and can easily be accessed. More in particular, the step 26 is located in the recess 33 together with the plate 32 in the retracted configuration.

Figure 3:
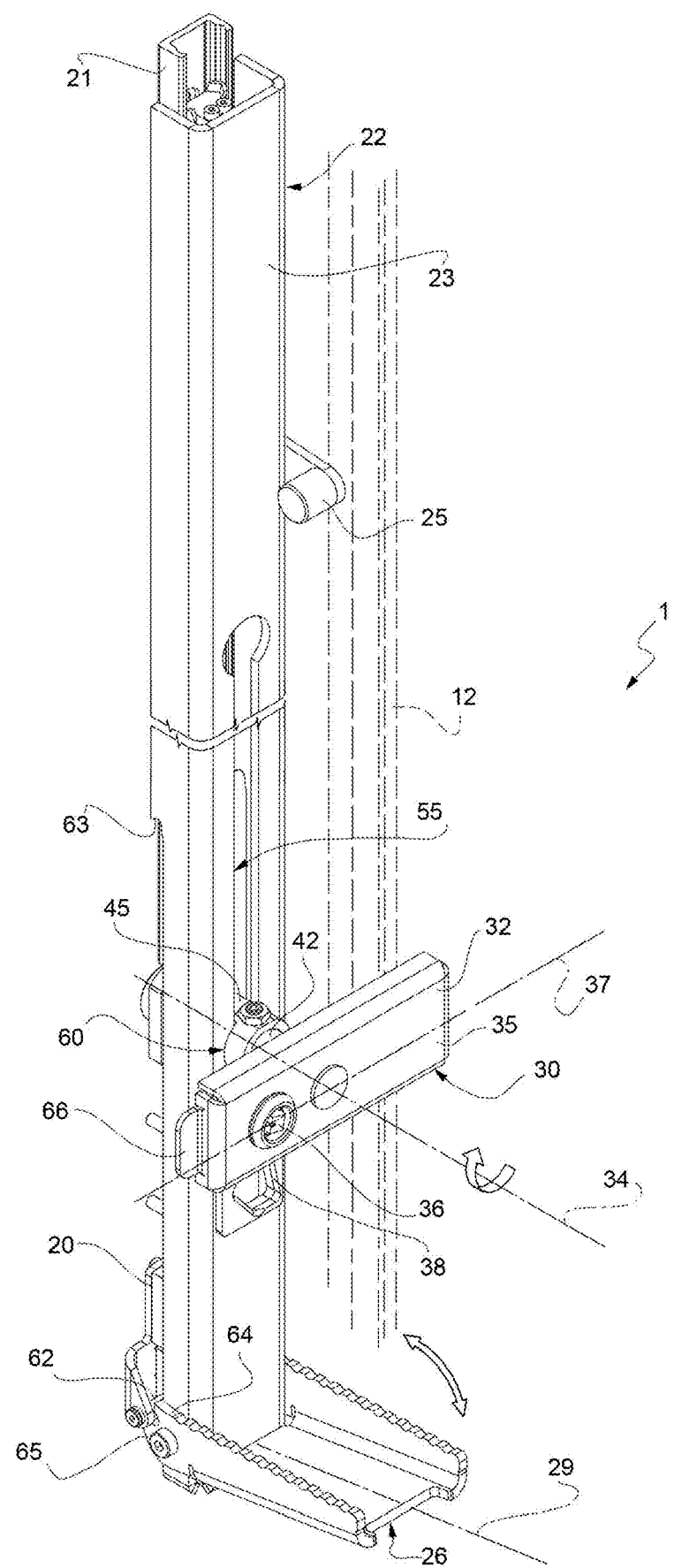
FIG. 3 is similar to FIG. 2 and shows the system according to the invention during a movement toward an extended operating configuration.

According to FIG. 3, in order to shift from the first to the second position and vice versa, the member 30 is manually rotated about a rotation axis 34, which is parallel to the axis 29, for example through a 90° rotation.

According to an aspect of the invention, the member 30 comprises an end portion 35, which preferably is part of the plate 32 and, in the second position, projects toward the inside of the car 2 along a horizontal axis 37 orthogonal to the axes 29 and 34 (relative to the bar 22 and in the place that was occupied by the member 30 in the first position). In this way, the end portion 35 projects past the upright 8 (FIG. 4) to as to intercept the path of the leaf 12 and fulfil a holding function which keeps the door 3 open. In particular, the vehicle is provided with known safety systems, which have a so-called "door sensitive edge" function, in order to prevent the door 3 from closing in the presence of obstacles. These systems are configured so as to recognize the presence of obstacles (in this case, the presence of the end portion 35), for example by detecting a greater resistance to the movement of the leaf 12, and, hence, to automatically stop the closing movement of the leaf 12 in order to prevent said obstacles from being crushed.

Therefore, the door 3 can close and the train is allowed to leave (thanks to other known safety systems associated with the closing of the doors) only if the member 30 has been removed from said second position, namely only if the system 1 has been brought back to the retracted configuration.

According, in particular, to FIG. 4, when the member 30 is in the second position, the end portion 35 engages the doorway 5 and, hence, faces an edge of the leaf 12 along the direction 14. At the same time, when the door 3 is closed, the leaf 12 physically prevents the plate 32 from moving to the second position, so that the bar 22 cannot be lowered and the system 1 is kept in the retracted configuration.

According to an embodiment which is not shown herein, in the opening position, the leaf 12 is arranged in front of the upright 8, outside of the car 2; in this case, the end portion 35, in the second position, projects along the axis 37 toward the outside of the car 2.

According to a further embodiment which is not shown herein, when the member 30 is in the second position of FIG. 3, the end portion 35 engages a retention seat especially made in the leaf 12 in order to keep the door 3 open, instead of being in front of the edge of the leaf 12.

According to further embodiments which are not shown herein, the member 30 and/or the end portion 35 can be replaced by components moving between the first and the second position with motions that are different from the rotary motion about the axis 34, for example a translation motion along the axis 37 or a rotary motion about a vertical axis.

The system 1 preferably comprises, in addition, a lock 36, which is configured so as to lock the member 30 to a reference shoulder 38, in order to hold the system 1 in the retracted configuration. The lock 36 can be released by means of a dedicated key or a standard key, so as to free the member 30. In particular, the lock 36 locks the member 30 in a third position, which corresponds to the retracted rest configuration, is distinct from the first position and is shown in FIG. 2 with a solid line. In order to shift from the first to the third position and vice versa, the member 30 follows a path that is different from the one extending between the first and the second position; in particular, the member 30 translates along the axis 34.

Figure 5:
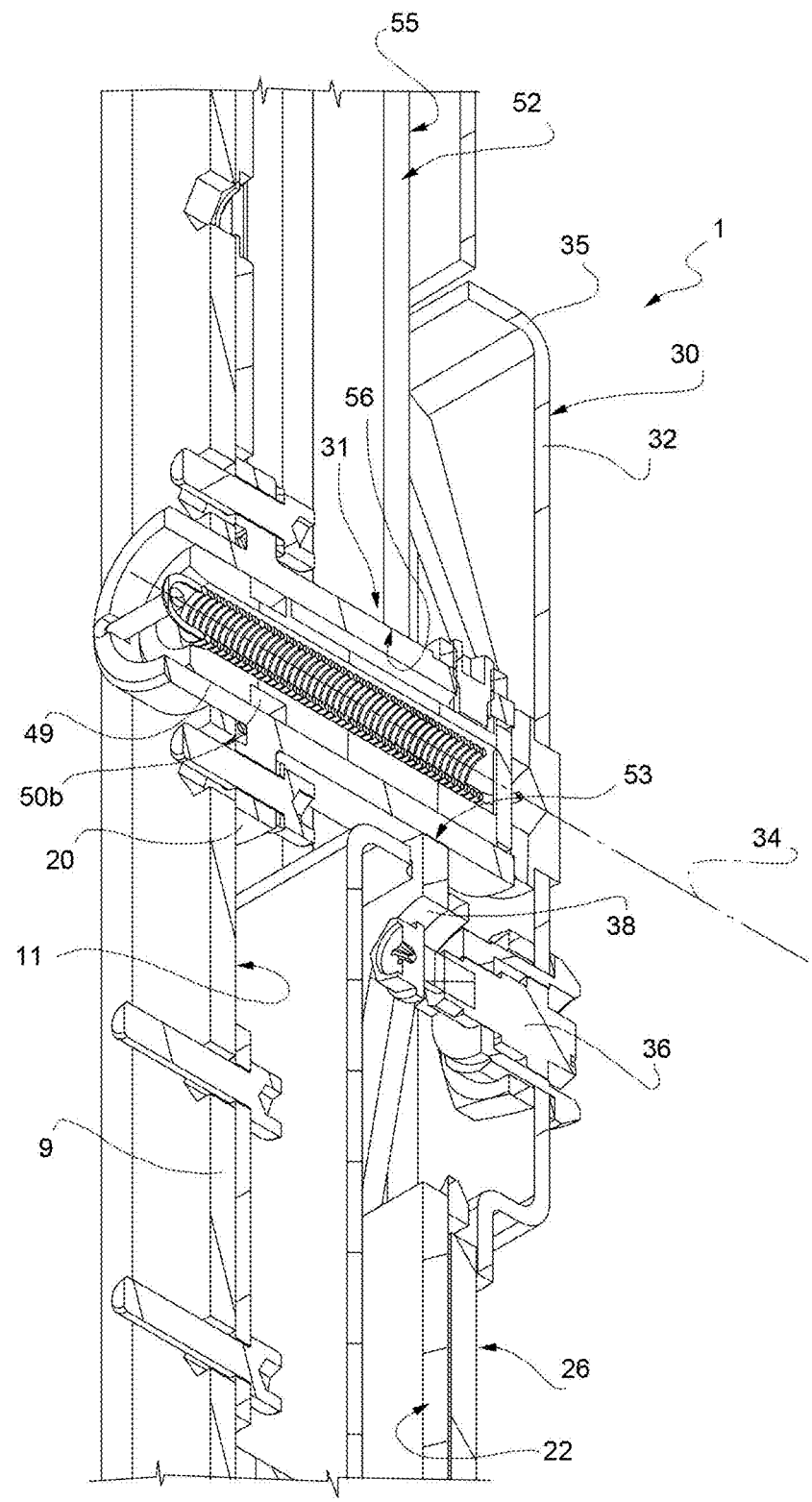
FIG. 5 is a detail of the system according to the invention in a cross section along a vertical section plane (identified by line V-V in FIG. 2) and shown in perspective from a different point of view.

With reference to FIG. 5, a spring 39 (or another equivalent elastic element) is interposed between the structure 20 and the member 30 and is pre-loaded so as to automatically move the member 30 backward from the first to the third position. More in detail, the lock 36 is configured so as to automatically snap and engage the shoulder 38, in order to lock the member 30, when the latter has moved backward to the third position because of the action of the spring 39.

In particular, the shoulder 38 is part of the bar 22; for example, the shoulder 38 is defined by an edge of a through hole, which is parallel to the axis 34.

The third position fulfils an additional safety function in order to avoid accidental activations, but it could be absent (in these cases, the lock 36 can lock the member 30 in the first position).

Figure 6:
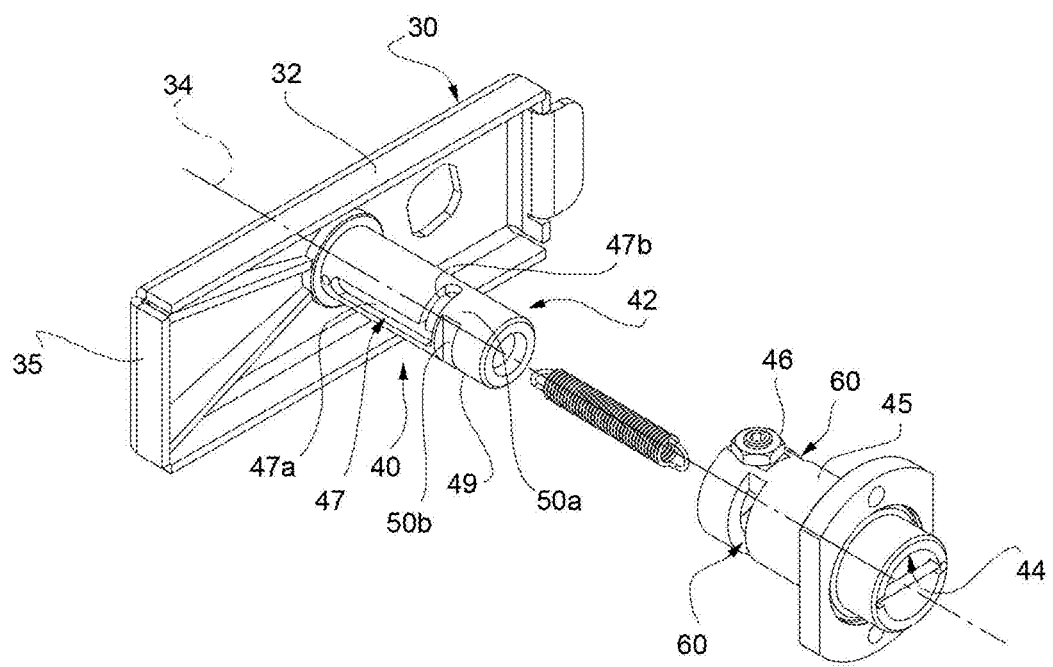
FIG. 6 shows, in a perspective and exploded view, some components that are visible in the detail of FIG. 5.

With reference to FIG. 6, the system 1 preferably further comprises a device 40, which guides the movements of the member 30 to the first, the second and the third position. The member 30 comprises a pin 42, which is fixed to the plate 32 and projects from the latter along the axis 34, whereas the device 40 comprises a seat 44, which is coaxial to the pin 42 and is engaged by the latter in a sliding manner. The seat 44 is defined by a sleeve or bushing 45, which is part of the structure 20 or is fixed to the structure 20. Furthermore, the device 40 comprises a guide dowel 46, which radially projects inside the seat 44 from an inner surface of the bushing 45, and a groove 47, which is obtained along an outer surface of the pin 42 and is engaged by the dowel 46 in a sliding manner.

In particular, the groove 47 comprises a portion 47a, which is straight and guides the axial translation of the member 30 between the third and the first position (also forbidding rotations about the axis 34), and a portion 47b, which is joined to the portion 47a and has the shape of an arc of a circle. The portion 47b prevents the pin 42 from translating backward toward the third position due to the action of the spring 39 (besides guiding the rotation of the member 30 between the first and the second position).

Furthermore, the groove 47 preferably defines the limit stops for the movements of the member 30.

According to variants which are not shown herein, the dowel 46 and the groove 47 are absent; or the dowel 46 radially projects from the outer surface of the pin 42, whereas the groove 47 is obtained on the inner surface of the bushing 45.

The spring 39 is preferably housed in an axial cavity of the pin 42 and is mounted in a way that is not described in detail (FIG. 5) so as to axially pull the pin 42.

Moreover, with reference to FIGS. 5 and 6, the pin 42 comprises a shaped portion 49, which is part of the stop device 31. In particular, the shaped portion 49 has a cylindrical area 50a and a reduced diameter area 50b, namely having a smaller diameter than the area 50a. For example, the area 50b is defined by two diametrically opposite flattened regions on the shaped portion 49. At the same time, the stop device 31 comprises an opening 52, which is made in the bar 22 and has a lower end 53, which is engaged by the pin 42 when the bar 22 is arranged in the raised position.

The end 53 is engaged by the shaped portion 49 (in a way that is not shown herein) when the member 30 is caused to move along the axis 34 to the first position.

The lower end 53 has a greater diameter than the areas 50a and 50b, so that the shaped portion 49 is free to rotate inside the lower end 53. In other words, in these conditions, the member 30 can be rotated about the axis 34 in order to reach the second position (FIG. 3).

The opening 52 further comprises a straight portion 55, which is vertical, is joined to the lower end 53 and has width, in horizontal, which is smaller than the diameter of the area 50a and greater than the diameter of the area 50b. The width narrowing from the end 53 to the straight portion 55 defines two shoulders 56 (FIGS. 4 and 5), which are vertically aligned with the shaped portion 49, if the pin 42 is oriented in the first position, so as to vertically rest against the area 50a and, hence, stop the downward movement of the bar 22.

According to FIG. 5, the shoulders 56 vertically rest against the outer surface of the pin 42 in order to stop the downward movement of the bar 22, even when the member 30 is axially arranged backward in the third position.

The straight portion 55 can vertically slide along the shaped portion 49 only if the pin 42 is oriented in the second position, namely only when the area 50b is capable to get into the straight portion 55 (namely, when the aforesaid flattened regions are vertical). Indeed, with this orientation, the shoulders 56 are no longer vertically aligned with the shaped portion 49 and, therefore, are not effective anymore, so that the bar 22 can lower due to the action of its own weight.

During the vertical sliding of the bar 22, the narrowed width of the straight portion 53 prevents the shaped portion 49 from rotating and, hence, prevents the member 30 from going back to the first position. In order to go back to the first position, indeed, the bar 22 needs to be manually lifted until the shaped portion 49 engages again the lower end 53 of the opening 52. In order to lift the bar 22, as already mentioned above, the appendage 25 has to be pushed upward.

Preferably, according to FIG. 3, the straight portion 55 has two vertical edges, which face one another along the axis 37 and can slide in two slits 60 (FIG. 6), which are made in the bushing 45 in diametrically opposite positions.

The system 1 further comprises at least one element 62, which is carried by the structure 20 in a fixed vertical position and vertically faces at least one shoulder 63 of the bar 22, so as to stop the bar 22 when moving downward to the lowered position, thanks to shoulder 63 resting against the element 62 (FIG. 4). In particular, the element 62 is defined by a pin, which is parallel to the axis 37.

Besides fulfilling this limit stop function, the element 62 also performs a cam function in order to cause the automatic movement of the step 26 to its vertical position during the upward movement of the bar 22. Indeed, the step 26 has an end 64 which is diametrically opposite the footboard 28 relative to the hinge axis and comprises a tappet element 65. The element 65 is vertically aligned with the element 62, when the bar 22 is in the lowered position and the step 26 is in the horizontal position (FIG. 4), and cooperates in contact with the element 62, when the bar 22 travels a final segment of the upward path (FIG. 3). During the lifting of the bar 22, the element 62 pushes the element 65 downward, thus exerting a lever action upon the step 26 in order to cause the end 64 to rotate downward and the footboard 28 upward, to the vertical position.

Once the bar 22 has reached its raised position, the element 62 engages the element 65 so as to keep the step 26 in its vertical position. In order to have an additional degree of safety, according to FIG. 2, the member 30 preferably comprises an end portion 66, which overlaps an end of the footboard 28, in a direction that is parallel to the axis 34, when the member 30 is arranged in the first and in the third position, so as to better hold the footboard 28 in the vertical position. In particular, the end portions 66 and 35 are at the opposite ends of the plate 32.

Owing to the above, it is evident that, in use, in order to move the system 1 from the retracted configuration to the extended configuration, it is necessary to carry out the following manual operations in sequence, after having opened the door 3:

releasing the lock 36 by means of the corresponding key;
moving the member 30 from the third to the first position, pulling the plate 32 against the action of the spring 39 (FIG. 2);
moving the member 30 from the first to the second position (FIG. 3).
Through the last movement, it simultaneously occurs that:
the leaf 12 is locked by the end portion 35 in the open position;
the bar 22 can freely move downward because of its own weight.

Finally, during the downward movement of the bar 22, the step 26 automatically rotates to the horizontal position because of its own weight and/or because of the interaction between the elements 62 and 65 in the first segment of the downward movement.

When the bar 22 reaches the lowered position (FIG. 4), the footboard 28 can be used to get into the car 2 and/or out of the latter. In particular, the step 26 reaches a height below the step 15, adding itself to the latter in order to allow the driver to easily get into and out of the train even when the car 2 does not stop in the area of a platform.

In order to take the system 1 back to the retracted configuration, first of all, the bar 22 needs to be manually lifted by acting upon the appendage 25 by a hand. At the end of this lifting, the footboard 28 is also lifted to the vertical position due to the action of the element 62 upon the element 65 (FIG. 3).

Then, keeping the appendage 25 raised, the other hand is used to move the member 30 from the second to the first position (FIG. 2). At this point, by simply letting go off the member 30, the latter automatically and quickly moves backward to the third position because of the effect of the spring 39 and, at the end of this movement, the lock 36 automatically snaps so as to lock the system 1, without having to use the key again (FIG. 2).

In particular, besides locking the bar 22 in its raised position, the step 26 remains locked in its vertical position due to the action of the element 62 and/or of the end portion 66.

Finally, since the end portion 35 does not hinder the leaf 12 any longer, the door 3 can be closed so as to allow the car 2 to leave.

Owing to the above, the advantages of the system 1 described above with reference to the accompanying drawings are evident. In particular, the system 1 has a high degree of safety, even if it is completely mechanical, since it keeps the door 3 open when the step 26 is lowered and needs to be used. Indeed, thanks to the holding function performed by the end portion 35, users have to retract the system 1 before the train can start running again; indeed, leaving the system 1 in the extended configuration would mean trying to travel with an open door, which is not permitted by the safety systems of the railway vehicle.

At the same time, the system 1 cannot be shifted to the extended configuration if the door 3 is closed, because the leaf 12 physically prevents the member 30 from being moved to the second position, so that the stop device 31 remains active.

Then, the presence of the lock 36 and/or the need to axially move the pin 42 from the third to the first position before rotating the plate 32 allow for an increase in the degree of safety, as they prevent the system 1 from moving to the extended configuration in an autonomous and/or accidental manner. At the same time, the system 1 can be extended and/or retraced by means of extremely simple manual operations, which can be carried out by one single operator.

Furthermore, the system 1 has extremely reduced size and can be installed as update or improvement in already produced and marketed vehicles, for it does not require special interactions with mechanical, electrical and electronic systems already present on board the car 2 (except for the positioning of the end portion 35, which is aimed at preventing the door 3 from closing).

Owing to the above, finally, the system 1 described and shown herein can evidently be subjected to changes and variations that do not go beyond the scope of protection of the invention, as set forth in the appended claims.

In particular, the member 30 could have different shapes and/or size and/or constructive features and/or movement paths, which are different from the ones described above by way of example, with reference to the plate 32 and/or to the pin 42; and/or the bar 22 could be replaced by another type of supporting element, for example a lever that can rotate between a raised position and a lowered position; and/or the system 1 could be built-in in the structure 9 of the upright 8 or be mounted on the side wall 6 or on the floor of the car 2; and/or the end portion 35 could be replaced by a different retention portion, even distinct from the member 30, which, tough, moves anyway in response to the activation of the member 30 so as to assume a projecting position, in which it prevents the door 3 from closing.

Furthermore, different steps can be provided, for example two steps, arranged at two different heights on one single supporting element or arranged on two different systems, similar to the one described above, one on the right and one on the left of the door 3, in case the height between the walking plane of the car 2 and the ballast is particularly great.

The invention claimed is:

1. A retractable-step system for getting into and out of a vehicle, the system comprising:
at least one step; and
a supporting element, which carries said step and is movable between a raised position and a lowered position; in the lowered position said step projecting from said supporting element along a first horizontal axis;
wherein the system further comprises:
a control member, which can be operated manually for being displaced between a first position and a second position;
a stop device, which is activated and deactivated in response to the displacement of said control member so as to withhold said supporting element in the raised position when said control member is arranged in the first position and so as to leave said supporting element free to move into the lowered position when said control member is arranged in the second position; and
a retention portion, which, in the second position of said control member, projects along a second horizontal axis orthogonal to said first horizontal axis so as to keep a vehicle door open, in use.

2. The system according to claim 1, wherein said retention portion is defined by an end portion of said control member.

3. The system according to claim 1, wherein the system comprises a lock that can be released by a key and constrains said control member to a reference shoulder so as to prevent said control member from being displaced into the second position.

4. The system according to claim 1, wherein said control member moves between said first and second positions with a rotary motion about a rotation axis.

5. The system according to claim 1, wherein said stop device comprises:
a stop body forming part of said supporting member; and
at least one shoulder which forms part of said supporting element and rests vertically on said stop body if said stop body is arranged in the first position.

6. The system according to claim 5, wherein said control member is moreover movable between the first position and a third position along a path different from the one provided between the first and second positions; and wherein the system comprises at least one elastic element that is preloaded to bring said control member automatically from the first position into the third position.

7. The system according to claim 6, wherein said shoulder rests vertically on said stop body if said stop body is arranged in the third position.

8. The system according to claim 6, wherein said control member moves between said first and third positions with a translational motion parallel to said first horizontal axis.

9. The system according to claim 5, wherein said stop body is defined by a pin that extends along an axis and engages an opening made in said supporting element.

10. The system according to claim 9, wherein said shoulder is defined by a narrowing of width of said opening.

11. The system according to claim 9, wherein said pin comprises a shaped portion having:
- a first area having a shape and/or size such as to be vertically aligned with said shoulder when said control member is arranged in the first position to stop lowering of said supporting element, and
- a second area having a shape and/or size such as not to be vertically aligned with said shoulder when said control member is arranged in the second position to allow said supporting element to lower.

12. The system according to claim 1, wherein said supporting element is defined by a vertically translating bar.

13. The system according to claim 1, wherein said step is coupled to said supporting element so as to move between a vertical position and a horizontal position; and wherein the system comprises a cam-and-tappet device for displacing said step automatically into the vertical position when said supporting element is displaced into the raised position.

14. A door assembly comprising a door and a retractable-step system according to claim 1; said door comprising:
- a doorway; and
- at least one leaf movable along a path for opening/closing said doorway;
- in the second position of said control member, said retention portion being arranged in a position such as to intercept said path and keep said door open.

15. The door assembly according to claim 14, wherein, in the second position of said control member, said retention portion engages said doorway.

* * * * *